United States Patent [19]

Louks

[11] 3,768,005
[45] Oct. 23, 1973

[54] INSULATION PIERCING DEVICE FOR TESTING CONTINUITY OF ELECTRICAL CIRCUIT

[76] Inventor: Robert A. Louks, Gilman, Iowa 50106

[22] Filed: Mar. 24, 1972

[21] Appl. No.: 237,721

[52] U.S. Cl.................. 324/51, 324/72.5, 324/133
[51] Int. Cl............................................. G01r 31/02
[58] Field of Search...................... 324/51, 53, 72.5, 324/133

[56] References Cited
UNITED STATES PATENTS

| | | | |
|---|---|---|---|
| 3,363,171 | 1/1968 | Sietmann et al. | 324/72.5 X |
| 3,662,259 | 5/1972 | Dapilito | 324/51 |
| 2,969,519 | 1/1961 | Thomas | 324/72.5 X |
| 2,639,318 | 5/1953 | DesRoches | 324/51 |
| 2,413,484 | 12/1946 | Berger | 324/53 |

FOREIGN PATENTS OR APPLICATIONS 829,353   6/1938   France.................................. 324/51

Primary Examiner—Gerard R. Strecker
Attorney—H. Robert Henderson et al.

[57] ABSTRACT

A circuit tester having a tubular non-conductive case with a conductive probe reciprocally carried therewithin. The probe is movable by a trigger mounted on the case and has a pointed end for piercing insulation covering a wire in a circuit to be tested. A hook is provided at one end of the case, and a conductive extension extending from the hook is aligned with the movable probe such that upon moving the probe forward it contacts the extension when a line is not held by the hook. A signal emitting device is carried within the case to indicate to an operator when a circuit is completed.

4 Claims, 7 Drawing Figures

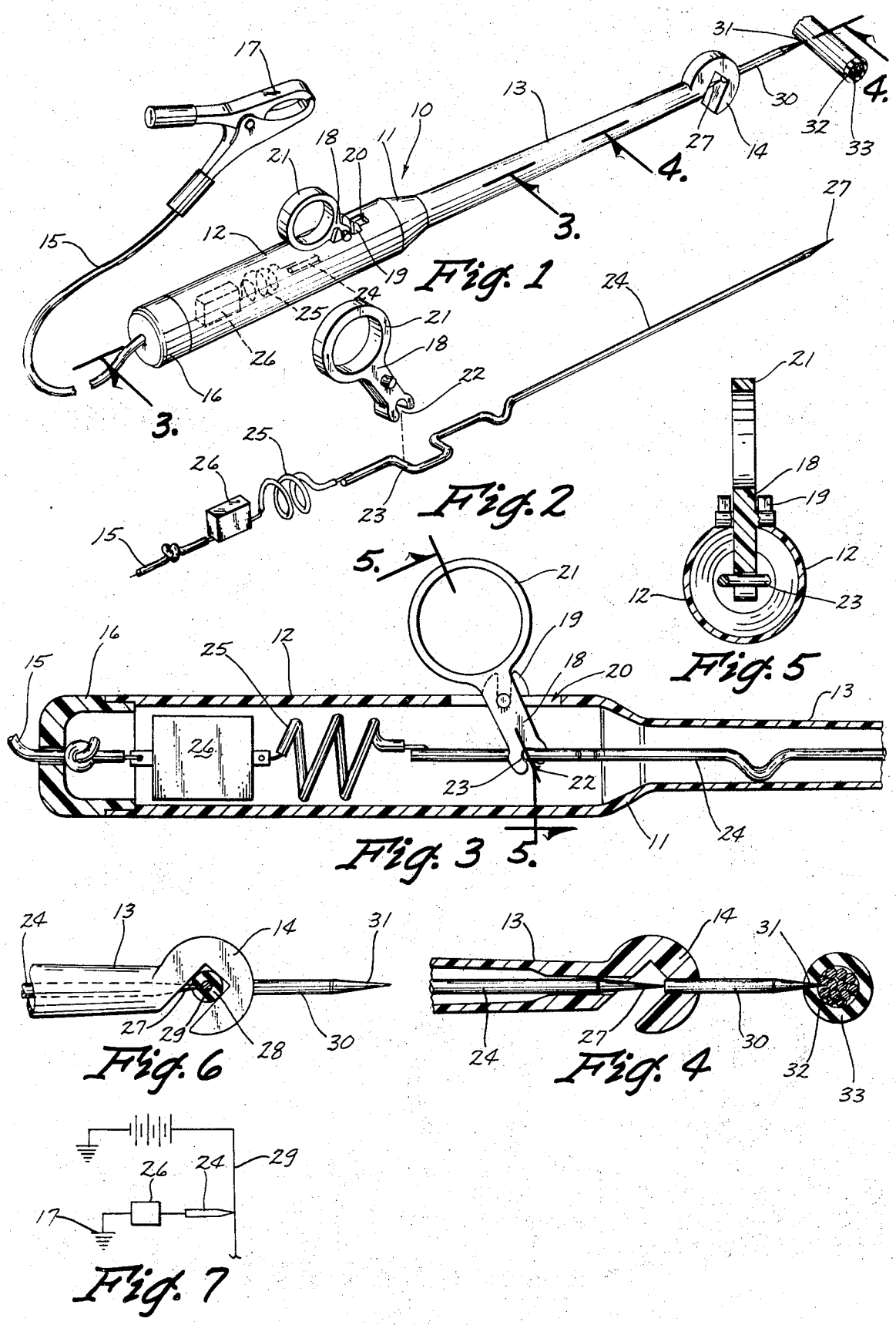

INSULATION PIERCING DEVICE FOR TESTING CONTINUITY OF ELECTRICAL CIRCUIT

BACKGROUND OF THE INVENTION

This invention relates to a circuit tester of the type having conductive probes. Devices of this type are used to test circuitry in electrical appliances and related devices, and often include a hook near a probe for holding a wire to be tested. Generally, a light is provided to indicate a circuit break to the operator.

Many such testers have been described in the prior art. U.S. Pat. Nos. 2,445,667; 2,529,270 and 3,363,171 all show a circuit tester having an insulation-piercing probe for testing a coated wire without the necessity of first removing the insulation therefrom. Additionally, U.S. Pats. Nos. 2,438,350, 2,639,318 and 2,969,519 describe circuit testers having a combination grappling hook and pointed probe to provide additional flexibility of operation. Many of the prior art testers include signal lights to indicate to an operator that current is flowing through the tester.

The prior art testers as described in the above-mentioned patents have all been useful to varying degrees. However, none of the prior art devices has provided a tester having the desirable features and flexibility of operation of a circuit tester according to the present invention.

SUMMARY OF THE INVENTION

According to this invention, a circuit tester is provided which has a grappling hook for holding a wire to be tested, and which also has an extension such that the tester can be used in situations where the hook is not needed.

More specifically, a tester in accordance with this invention includes an elongated tubular case formed of non-conductive material and having an elongated conductive probe reciprocally mounted therewithin. A grappling hook is provided at one end of the case for holding a wire to be tested. Embedded in the grappling hook is an extension probe which is contacted by the movable probe upon full longitudinal extension thereof to allow the tester to be used on lines not amenable to holding in the grappling hook. Thus, this invention provides a single tester that can be used as a conventional probe contact and can also be used as an insulation-piercing probe contact wherein an insulated wire is held by a grappling hook.

The probe is moved longitudinally within the tubular case by means of a trigger mounted on the case and connected to the probe.

A further feature of the invention is the provision of an audio signal actuated by completion of the test circuit.

It is accordingly an object of this invention to provide an improved circuit tester which may be used selectively as a conventional probe device or as an insulation-piercing tester.

It is a further object to provide such a tester with an audio signal means.

BRIEF DESCRIPTION OF THE DRAWINGS

FIG. 1 is a perspective view showing a circuit tester in accordance with this invention.

FIG. 2 is a perspective view showing the interal components of the circuit tester and a trigger for movement of same.

FIG. 3 is a cross-sectional view taken along the line 3—3 of FIG. 1.

FIG. 4 is a cross-sectional view taken along the line 4—4 of FIG. 1.

FIG. 5 is a cross-sectional view taken along the line 5—5 of FIG. 3.

FIG. 6 is an enlarged side elevational view showing the insulation-piercing mode of operation.

FIG. 7 is a schematic circuit diagram of the device.

DESCRIPTION OF THE PREFERRED EMBODIMENT

The preferred embodiment of the invention will be described by reference to the drawings. It will be apparent that numerous variations and modifications to the specific structure depicted in the drawings and described below could be made without departing from the invention.

A circuit tester is indicated generally at 10 in FIG. 1. The circuit tester 10 includes an elongated tubular case 11 having an enlarged handle 12 and a slender probe sleeve 13 terminating in a grappling hook 14 at the end thereof. The entire tubular case 11 and hook 14 are formed of a non-conductive material such as molded rubber or polymeric material.

A cable 15 extends through an opening in cap 16 affixed to the rear end of the tubular case 11, and terminates at a conventional clamp 17 for connection to a line in a circuit to be tested, as is conventional. A trigger 18 (FIGS. 1, 2, 3 and 5) is pivotally attached to tabs 19 formed on tubular case 11, the trigger 18 extending into the interior of tubular case 11 through a slot 20 formed therein. The exposed end of trigger 18 is a closed loop 21 adapted for back-and-forth movement by an operator. The end of trigger 18 housed within case 11 includes a channel 22 adapted to receive a section 23 of an elongated probe 24 carried within the case 11 and movable longitudinally therein in response to pivotal movement of the trigger 18.

As best seen in FIGS. 2 and 3, the rear end of the probe 24 is connected by a flexible coil of wire 25 to a signal means 26, preferably a buzzer of the type widely used in automobiles to indicate a key left in the ignition, etc. The cable 15 from the clamp 17 is connected to the other contact of the signal means 26.

The working end of the probe 24 is formed with a sharp point 27, and as shown in FIG. 6 this point, upon the operator pulling the trigger 18, moves forwardly to engage and pierce a coating of insulation 28 around a wire 29 held in the grappling hook 14 of the tester. The general idea of insulation-piercing probes is of course wellknown, and no claim is made to this feature per se.

Referring now to FIG. 4, an extension 30 of conductive material is embedded in the hook 14, and is axially aligned with the probe 24. Upon movement of probe 24 to its extended position (FIG. 4) the point 27 of probe 24 contacts the rear of extension 30 such that the pointed end 31 of extension 30 is in communication with the signal means 26 such that a wire 32 that is, for example, too large to fit in hook 14 can be tested. Also, many times contacts or lines are not suited for placement within the hook 14, and this device provides a means for testing either in the hook or externally thereof. The extension 30 is shown piercing an insulation layer 33 on line 32, but it could obviously also be used to test uncovered wires.

An important feature of the extension 30 of this invention, compared to prior art devices, is that when the device of this invention is being used to test a line held in the hook 14, the extension 30 is not in the test circuit. The prior art devices that combined a hook and an extension are so designed that the extension is always in the test circuit, leading to undesired contact of the extension with open lines, etc. located near a line held by the hook. In the device of the invention, the extension 30 is only in the test circuit when the operator desires, giving much better control and flexibility to the tester.

The closed loop 21 of the trigger 18 enables the operator to selectively extend and retract the probe 24 within the case 11.

The signal device 26 was previously mentioned as preferably being an audio device. A buzzer or the like enables the operator to test without having to take his eyes off the circuit being tested. Additionally, the lights commonly used on circuit testers are difficult to see in conditions of bright light.

The operation of the device will now be briefly described. First, as to the use of the tester 10 utilizing the hook 14, the clamp 17 is connected to one side of an element or circuit being tested, as is conventional. The line 29 is grasped by the hook 14, and the trigger 18 is pulled by the operator. Pulling the trigger 18 toward the rear of the tubular case causes the probe 24 to move forward (FIG. 3) and results in the point 27 of probe 24 piercing the insulation 28 around wire 29 held in the hook 14 (FIG. 6). If a circuit is completed, the buzzer 26 will sound, indicating to the operator that there is current in the circuit around which he is testing.

As to the use of the tester wherein the extension 30 is utilized, such as for testing a contact or line that cannot be conveniently held by the hook 14, the point 31 of extension 30 is placed in contact with the line to be tested. FIG. 4 illustrates this mode of operation wherein a line 32 having insulation 33 is too large to fit the hook 14. An uninsulated line or contact point could also be similarly tested. To complete the test, the operator pulls the trigger 18, extending point 27 of probe 24 into contact with the rear of extension 30 (FIG. 4). As in the previous case, a signal from the buzzer indicates current in the circuit to the tester.

The extension 30 is also useful in guiding the tester through a group of wires, etc., and the extension 30 is isolated from the test circuit unless the trigger 18 is pulled by the operator.

The above description of the preferred embodiment of the invention, and the operation thereof, is exemplary rather than limiting of the scope of the invention, which is defined by the appended claims.

I claim:

1. A circuit testing device comprising:
    a tubular case member formed of a non-conductive material, the case member having a non-conductive hook means at one end thereof adapted to hold a line being tested;
    a probe means reciprocally movable longitudinally within the case member and having a pointed end movable into contact with a line held by the hook means;
    trigger means mounted on the case member and connected to the probe means to effect longitudinal movement thereof;
    a conductive means extending from the case member and having a clamp at the end thereof for connection to the circuit to be tested;
    a signaling means connected to the conductive means and the probe means; and
    a conductive extension axially aligned with the probe means and fixedly mounted in an opening in the non-conductive hook means such that upon movement of the probe means to an extended position, when the hook means is not holding a line for testing, the probe means contacts the extension thereby enabling the testing device to be used in testing circuits without the line being tested being located in the hook means, the extension means being out of electrical communication with the remainder of the testing device when the probe means is not in contact with the extension means.

2. The circuit testing device of claim 1 wherein the signal means is an audio means.

3. The circuit testing device of claim 1 wherein the trigger means comprises an enclosed loop.

4. The circuit testing device of claim 1 wherein the probe means includes a portion at right angles to the main body thereof, said portion being gripped by an end of the trigger means.

* * * * *